United States Patent [19]

Koike

[11] Patent Number: 4,648,086
[45] Date of Patent: Mar. 3, 1987

[54] SIMPLIFIED SOUND REPRODUCING DEVICE CAPABLE OF REPRODUCING A PLURALITY OF RECORDED ITEMS

[75] Inventor: Eishi Koike, Sagamihara, Japan

[73] Assignee: Ozen Corporation, Tokyo, Japan

[21] Appl. No.: 700,753

[22] Filed: Feb. 12, 1985

[30] Foreign Application Priority Data

Feb. 14, 1984 [JP] Japan .................................. 59-25860

[51] Int. Cl.⁴ .............................................. G11B 3/40
[52] U.S. Cl. ...................................... 369/65; 369/63; 369/177
[58] Field of Search ............................ 369/177, 63, 65

[56] References Cited

U.S. PATENT DOCUMENTS

| 4,123,065 | 10/1978 | Watanabe | 369/177 |
| 4,195,844 | 4/1980 | Okamura et al. | 369/177 |
| 4,373,199 | 2/1983 | Watanabe | 369/65 |
| 4,485,466 | 11/1984 | Fekete | 369/177 |
| 4,498,160 | 2/1985 | Koiki | 369/177 |

Primary Examiner—Steven L. Stephan
Attorney, Agent, or Firm—Basile, Weintraub & Hanlon

[57] ABSTRACT

A simplified sound reproducing device in which the stylus force of a reproducing stylus is imparted by a stylus pressure spring, the weight of the turn table being independently supported so that only the weight of the stylus and related tone arm are impinged upon the record to be reproduced. The stylus force imparted by the stylus pressure spring permits the stylus to remain in contact with the record disc following its undulations and reproducing high quality sounds.

5 Claims, 7 Drawing Figures

SIMPLIFIED SOUND REPRODUCING DEVICE CAPABLE OF REPRODUCING A PLURALITY OF RECORDED ITEMS

BACKGROUND OF THE INVENTION

I. Field of the Invention

This invention relates to a sound reproducing device, particularly those capable of reproducing sounds from a record disc, having a plurality of record grooves.

II. Description of the Prior Art

To provide simplified sound reproducing devices comprising electrical circuit or circuits, capable of selectively reproducing recorded items from a record disc having a plurality of record grooves is known. Examples of such devices are Japanese Examined Patent Publication No. 53819/1976, Japanese Un-Examined Patent Publication No. 130808/1981 and U.S. Pat. No. 4,373,177.

The manufacture of simplified sound reproducing devices which mechanically select and reproduce the sounds recorded on a record disc having a plurality of record grooves is also known (Japanese Patent No. 838808).

Because the reproducing stylus severely impinges on the record disc in the conventional devices having electrical circuits, sound reproducing devices of conventional design can damage both the record disc and the reproduction stylus. Such designs allow the stylus to jump, precluding exact selection of the record groove to be reproduced. Similarly, where selection of recorded sounds is accomplished mechanically, severe impinging of the reproducing stylus onto the record disc can damage the record disc and the stylus. Since the stylus force is imparted by a stylus pressure spring urging the stylus toward the turn table it has been almost impossible to make fine adjustments in the stylus force and to reproduce the recorded sounds with correct sound quality in a manner which permits the stylus to respond to undulations in the record surface.

OBJECT OF THE INVENTION

An object of the present invention is to make the selective action in a simplified sound reproducing device which selects a plurality of recorded grooves by electrical means more precise.

A further object of the present invention is to provide a simplified sound reproducing device capable of selectively reproducing the recorded sound from a plurality of record grooves, while eliminating the severe impinging motion of the stylus onto the record disc which results in damage to both the record disc and the stylus itself.

A still further object of the present invention is to provide a simplified sound reproducing device which is able to selectively reproduce the sound recorded on a plurality of record grooves and to impart a stylus force to the reproducing stylus in such a manner that it can duly follow the undulations in the groove while playing.

SUMMARY OF THE INVENTION

The present invention sets forth a simplified sound reproducing device in which the stylus force of a reproducing stylus of the device is imparted by a stylus pressure spring disposed in such a manner that the weight of the turn table need not be applied to the record.

The turn table has, around its side periphery, a plurality of coupling recesses corresponding to the number of grooves in the record disc. A stop lever is disposed above the turn table. The stop lever has a tip end which is normally urged to or from the upper face of the record disc. The stop lever also has a rib which engages a part of the tone arm of the device to make the stop lever swing to or from from the record disc. The rib has an inclined face on its upper side to slidably contact with the tone arm. A guide portion is formed at a suitable position above the turn table to guide the rib when the rib and the tone arm are engaged.

The present invention also has a start lever which is normally retracted and has a locking face oriented in the direction of retraction. A start key forces the start lever out of its retracted position.

The device also has a selection lever correlated with the start lever. The forward tip end of the selection member is urged to engage one of the coupling recesses in the turn table. The forward tip end of the selection member is retracted upon advancement of the start lever by a solenoid which is kept OFF to permit a solenoid flapper to hold the selection lever in its retracted position.

The device has a reset lever, journally received by a reset pin and disposed parallel to a center pin. The reset lever can swingably rotate in a direction opposed to the rotation of the turn table. One end of the reset lever extends to the position at which the forward end of the stop lever is released from the restraint by the tone arm to advance upward. The other end of the reset lever is positioned to permit it to be allowed to be turned and placed under the locking face of the start lever in its advanced position to hold the start lever thereat.

A stylus pressure lever engages an acoustic cylinder to permit reciprocal motion along the axis of the acoustic cylinder to allow advance movement of the acoustic cylinder. The stylus pressure lever, when moved away from engagement with the acoustic cylinder, permits the acoustic cylinder to retract in its axial direction. Thus, the start lever can fix the acoustic cylinder in its retracted position.

In the present invention, the reproduction stylus imparts the necessary and sufficient stylus force, by means of a stylus pressure spring, without being further loaded with the mass of heavy members such as a turn table. This permits the device to follow the undulations in the record disc and reproduce high quality sound.

The present invention prevents the record disc from being violently hit by the reproducing stylus during the series of operations beginning with the selection of the recorded groove to be reproduced up to the end of sound reproduction. This reduces the possibility of damage to the record disc or the reproducing stylus, and eliminates the possibility of wrong selection due to jumping of the reproduction stylus. Since the reproduction stylus need not be placed close to the record disc, the reproduction stylus can be kept in its retracted position and will never injure an operator's finger or hand.

BRIEF DESCRIPTION OF THE DRAWINGS

The various features, advantages and other uses of the present invention will become more apparent by referring to the following detailed description and drawing in which.

DETAILED DESCRIPTION OF THE PREFERRED EMBODIMENTS

Figure 1:
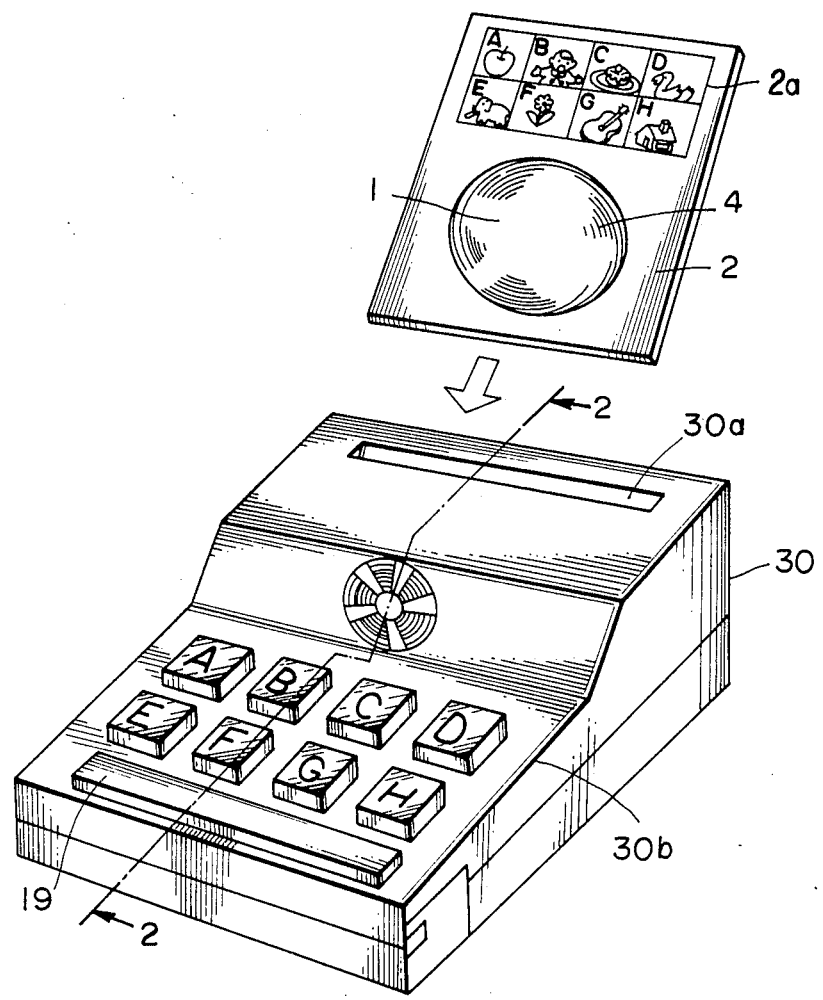
FIG. 1 is a perspective view of a toy incorporating the device of the present invention.
Figure 2:
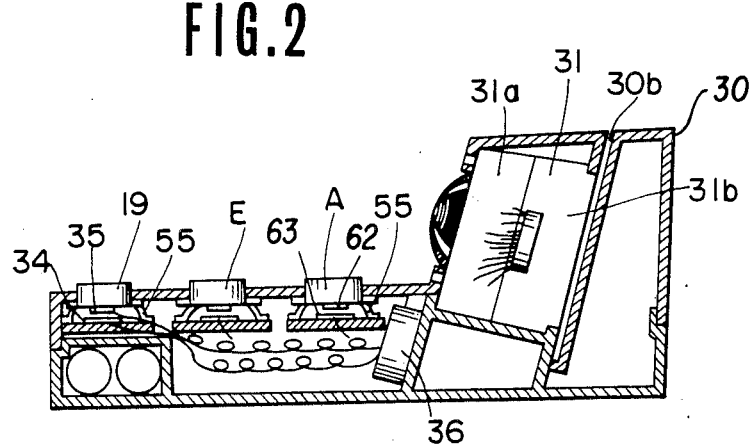
FIG. 2 is a sectional view taken along the 2—2 line of FIG. 1.

As shown in FIG. 1 and FIG. 2, the main body of the present invention can be incorporated in a toy 30 having a configuration like a typewriter. On the upper face of a key board 30b, a plurality of keys A–H and a start key 19, designed to simulate a space bar, are disposed.

As shown in FIG. 2, the main body of the device of the present invention is received in the toy 30 and is attached to a slantingly upstanding portion of the casing 31. The start key 19 and reproduction selection keys A–H are connected to a start lever 18 and to a fixed contact 12 in the main body of the device by means of conventional electric wiring. The keys A–H and the start key 19 are resiliently supported by a leaf spring 55. Each of the reproduction selection keys A–H, respectively, has a movable contact 62 and a fixed contact 63, and these fixed contacts 63 are mutually connected. The combination of movable contacts 62 and fixed contacts 63 define a selector switch 49 in FIG. 3 for selective sound reproduction. The start key 19, also, houses a fixed contact 34 and a movable contact 35 which is connected to a suitable electric actuator 36. The electric actuator 36 is disposed to depress the start lever 18 in FIGS. 4 and 5, in a manner to be described subsequently.

As seen in FIG. 1, the toy 30 has a slit 30a at the upstanding slant portion for inserting a record disc 2 thereinto.

The record disc 2 has, on its one face, eight record grooves 1, each with their starting point of reproduction being placed along the periphery of the disc in spiral shape. On that face, the record disc 2 also has an indication part 2a for representing recorded items corresponding to the keys A–H for permitting selective sound reproduction. The indication part 2a remains outside and above the upper surface of the toy 30 to allow the user to visually inspect the record disc selections, when the record disc 2 is fully inserted in the slit 30a. The record face of disc 2 is held fixedly in place so that it faces reproduction stylus 3 in FIGS. 4 and 5, in a manner to be described subsequently.

Figure 4:
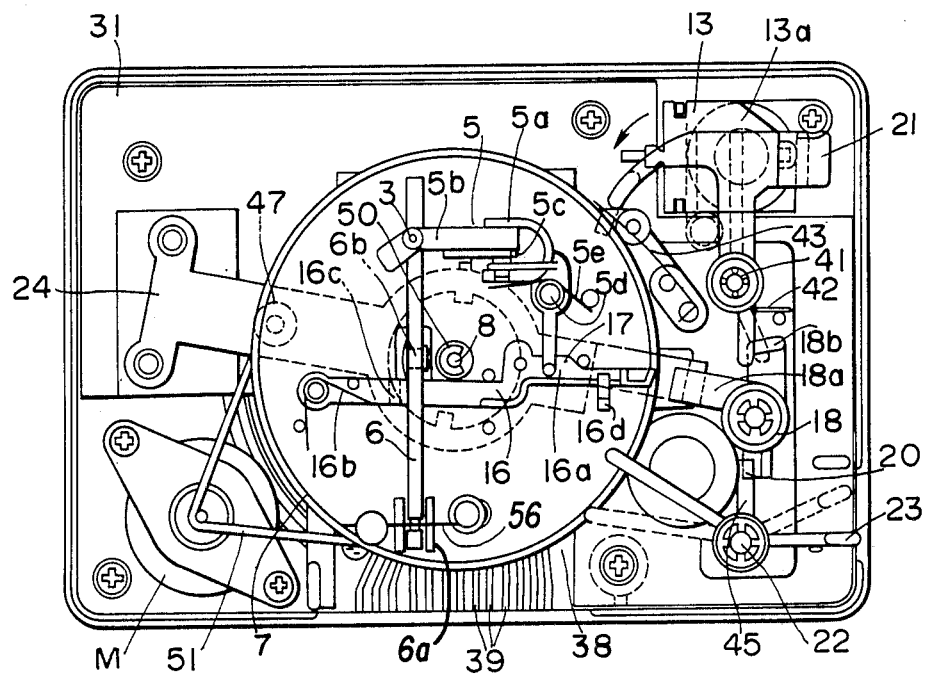
FIG. 4 is a plan view of the present invention, with its housing having been removed for purposes of clarity.
Figure 5:
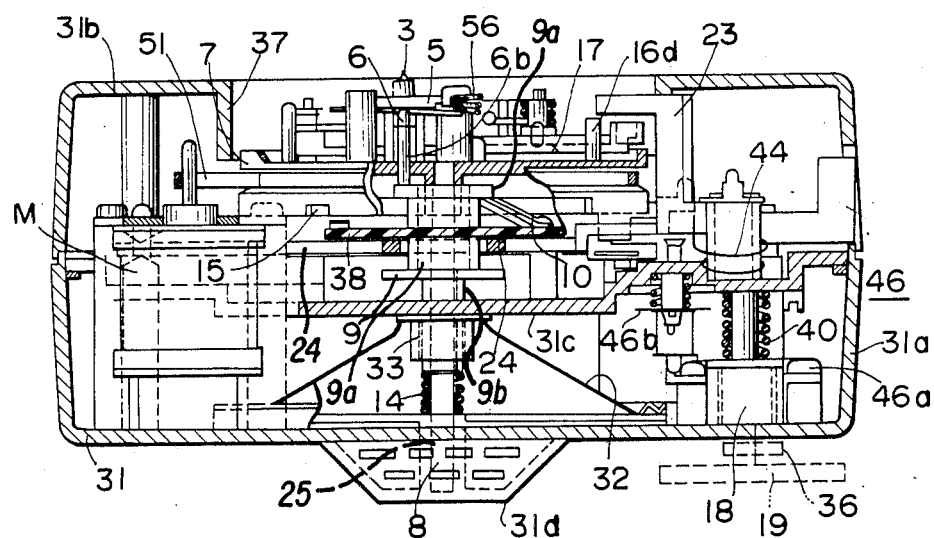
FIG. 5 is a sectional view of the present invention.
Figure 6:
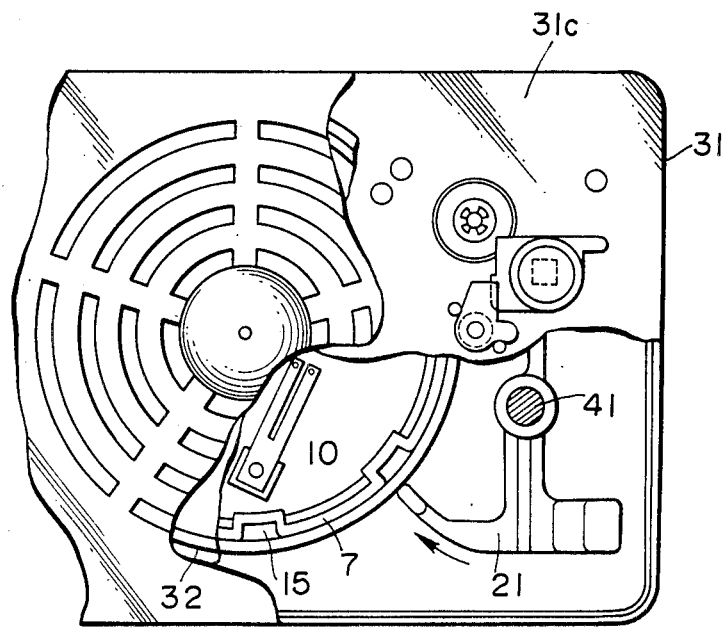
FIG. 6 is a partial bottom view with its chassis and middle plate being fragmented.

As shown in FIGS. 4, 5 and 6, the main body of the device of this invention has a casing 31, within which necessary structure is arranged. The casing 31 comprises a chassis 31a and a housing 31b fixed on the chassis 31a with an open end being directed down. Between the chassis 31a and the housing 31b, a middle plate 31c is interposed to separate the two members.

At the middle exterior of the chassis 31a, a projecting sound outlet 31d is formed. At the central part of this sound outlet 31d, a center pin 8, fixedly held by a sleeve 25, extends from the chassis 31a to the interior of the housing 31d, by passing through the housing 31b.

Within the chassis 31a a speaker cone 32 is fixed with its large open head portion oriented toward sound outlet 31d. A cyclinder cone head 33 is fixed inside speaker cone 32. This cone head 33 has sufficient diameter to surround center pin 8 without contacting it. At the upper part of the center pin 8, an acoustic cylinder 9 having flanges 9a at both ends and a sleeve 9b integrally formed at its lower end, is disposed along the center pin 8. The acoustic cylinder is capable of advancing or retracting in the axial direction.

A sleeve 9b which slidably contacts the cone head 33 is inserted between the cone head 33 and the center pin 8 and projects beyond the opposite end of the cone head 33.

A stylus pressure spring 14, such as a coil spring, is compressably disposed between the lower end of the sleeve 9b and the upper end of the sleeve 25 formed on the sound outlet 31d. In normal operation, the stylus pressure spring 14 resiliently urges the lower end face of the sleeve 9b of the acoustic cylinder 9 upward. Thus the acoustic cylinder 9 is normally urged upward along the center pin 8. A turn table 7 is rotatably mounted around the center pin 8 at the upper part of the acoustic cylinder 9.

An E-shaped washer 50, which prevents undesirable coming off movement of the turn table 7, is located on center pin 8. The turn table 7 has a rotary peripheral side face constituting a pulley which is coupled to the output shaft of the motor M, via a resilient belt 51. Thus, the turn table 7 is rotatably driven by the motor M.

A rotary slidable contact 10, similar to a leaf spring, is attached to the lower face of the turn table 7 so that it can rotate along with it.

A sound transmitting member 6, a tone arm 5 and a stop lever 16 are placed and fixed on the upper face of the turn table 7. The sound transmitting member 6 is disposed near the center pin 8 and extends transversely above the turn table 7. A first end of the sound transmitting member 6 is swingably received by a bearing 6a in FIG. 4 so that the second end can swingably move away from the upper face of the turn table 7. A spring 56 is swingably received in the bearing 6a to resiliently contact the first end portion of the sound transmitting member 6 from above so that the second end of the sound transmitting member 6 can approach the upper face of the turn table 7.

A sound transmitting tip 6b projects from the lower face of the sound transmitting member 6 and is disposed approximately halfway between the two ends. The tip 6b projects below the turn table 7 through a hole formed in the turn table 7 and resiliently contacts the acoustic cylinder 9.

The stop lever 16 extends transversely to and below the sound transmitting member 6 so that the stop lever 16 can cross the latter. One end of stop lever 16 is resiliently received by a spring 16b and urged toward the upper face of the turn table 7. The other end of stop lever 16 is swingably received at the bracket 16d to permit a vertical motion above the upper face of the turn table 7.

At the mid-point between the two ends of stop lever 16, a projection 16c is formed. The projection 16c acts as a fulcrum. Thus, as one end of the stop lever 16 is urged toward the upper face of the turn table 7, the other end of the stop lever 16 leaves from the upper face of the turn table 7 so as to be located at the near point to periphery of the turn table.

The projection 16c can be formed up to the end point opposed to the spring 16b. A rib 16a is formed along the longitudinal direction of the stop lever 16. At the end of the rib 16a adjacent to the end point of sound reproduction, an upwardly inclined face, descending down from the top to the bottom, is formed thereby creating a guide portion 17 to permit vertical movement of the rib 16a below the tone arm.

As shown in FIG. 4, a bracket 16d for restraining the stop lever 16 is provided. The bracket 16d comprises an overhang portion and upstanding post portion.

The tone arm 5 comprises a base portion 5a and a pickup 5b journally received by the base portion 5a. The base portion 5a is capable of swingable movement away from the upper face of the turn table 7. An upwardly projecting reproduction stylus 3 is located at the tip end of a pickup 5b. The pickup 5b is placed on and transversely crosses the sound transmitting member 6 so that the reproduction stylus 3 of pickup 5b can be supported at the rear end of pickup 5b. The portion journally attached to the base portion is provided with a torsion spring 5c. The rear end of the pickup 5b contacts the sound transmitting member 6 with the portion of reproducing stylus.

The base portion 5a is journally supported around a pin 5d so that the base portion 5a, as a whole, can be rotated along the upper face of the turn table 7. A return spring 5e is fixed around the journalled portion so that the reproduction stylus 3 is normally urged toward the outer periphery in the direction opposed to the center of the turn table 7.

The tone arm 5, at the rear part of the base portion 5a, which is opposed to the pickup 5b with respect to the pin 5d, extends to and rests on the rib 16a of the stop lever 16. The tone arm 5, as particularly shown in FIG. 4, has a bent, L-shaped configuration.

Figure 7:
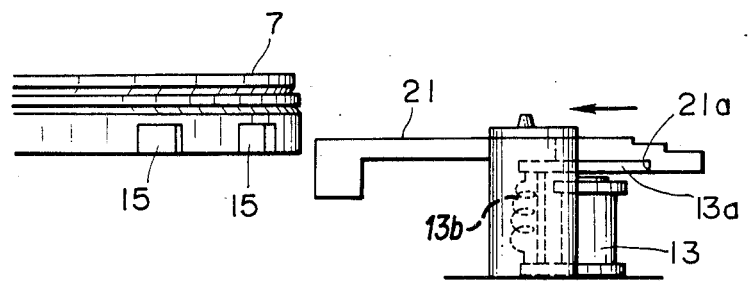
FIG. 7 is a perspective view with its turn table, select lever and a solenoid having been extracted.

As shown in FIGS. 5, 6 and 7 a plurality of coupling recesses 15, corresponding in number to that of the record grooves of the record disc 2, are disposed around the turn table 7 at a predetermined pitch. The turn table 7, constructed as shown in FIG. 5, confronts a circular opening 37, formed through the upper face of the housing 31b, and rotates therein, so that the sound reproducing stylus 3 is rotated, while projecting slightly above the upper face of the housing 31b.

The record disc 2 is inserted and held in the slit 30a of the toy 30 with the record grooves 1 of the record disc 2 facing the opening 37. In this condition, the reproduction stylus 3 is urged by the stylus presure spring 14 towards record groove of the record disc.

A printed circuit board 38 is fixed above the middle plate 31c such that the upper face of the printed circuit board 38 confronts the lower face of the turn table 7, permitting the rotary slidable contact 10, fixed to the turn table 7, to slidably move on it. A plurality of fixed contacts 12 are positioned on the upper face of the printed wiring board 38, corresponding to the number of starting points of sound reproduction 4. In the preferred embodiment, eight starting points of sound reproduction, are arranged to establish pre-selected locational relationships with respect to each starting point of sound reproduction 4.

As shown in FIG. 4 lead wires 39 extend from the fixed contacts 12 to the terminals. The start lever 18, supported by the chassis 31a and the middle plate 31c, is capable of advancing and retracting in the vertical direction. The start lever 18 is normally urged toward retracting direction under the middle plate 31c by the coil spring 40 while the tip part of which remains above middle plate 31c. The electric actuator 36, actuated by the starting key 19 disposed on the toy 30, is correlated such that the electric actuator 36 can push and advance the start lever 18 against the urging of the coil spring 40. The start lever 18 has a downwardly facing locking face 20. A stylus pressure control piece 18a and an upwardly facing inclined face 18b are supported at a portion radially projecting from the center of the start lever 18 above the middle plate 31c.

Alongside the start lever 18 and adjacent to the turn table 7, a selection lever 21 is swingably received by a shaft 41. The shaft 41 of the selection lever 21 is disposed parallel to the center pin 8 such that the tip end portion of the selection lever 21 can confront and engage one of the coupling recesses 15 formed around the side periphery of the turn table 7. The selection lever 21 has a hammer-like configuration and is urged by a torsion spring 42 located at shaft 41, so that the tip end portion of the selection lever 21 can advance toward the coupling recesses 15 of the turn table 7.

The end portion of the handle of the selection lever 21, opposed to the tip end portion with respect to the shaft 41, extends onto the upwardly facing inclined face 18b of the start lever 18, so that it is urged by the axial advancement of the facing inclined face 18b. This results in the retraction of the tip end from the engagement with the coupling recess 15 of the turn table 7 against the resilient force of the torsion spring 42.

A first switch 43 is held by the selection lever 21 in the "OFF" position in the electric circuit of the motor M immediately before the tip end of the selection lever 21 engages a coupling recess 15. The first switch 43 extends below the coupling recesses 15 and will be supported by the lower part of the forward end portion of the selection lever 21 where the selection lever will be advanced.

The selection lever 21, as shown in FIG. 4 and more particularly in FIG. 7, has on its lower face, a locking face 21a oriented in the vertical direction. At the lower part of the selection lever 21, a solenoid 13 is fixedly attached. The solenoid has a flapper 13a, the foward end of which is normally urged by a spring 13b toward the lower face of the selection lever 21. The forward end face of the flapper 13a locks the locking face 21a, which allows the selection lever 21 to be held at its retracted position.

At the side opposite to the selection lever 21, with respect to the starting lever 18, a reset lever 23 is journally received by a reset pin 22 which is parallel to the center pin 8. The reset lever 23 is urged by a torsion spring 44 toward the direction opposite to the direction of rotation of the turn table 7.

The reset lever 23 takes its position at a level where the forward end portion thereof extends at the height of the tip end of the raised stop lever 16 when moving upward away from the upper face of the turn table 7. Accordingly, when the stop lever 16 is forced by the tone arm 5 at the rib 16a to be held close to the upper face of the turn table 7, the forward end of the reset lever 23 is kept clear of the stop lever 16 to cause no interference with it. The reset lever 23 is pushed against an pole upstanding from middle plate 31c and is locked thereby against its rotation. The reset lever 23 has a projection 45 which extends above the locking face 20 of the start lever 18 in said locked situation. The upper face of the projection 45 is flat, while the lower face has an inclined face or surface directed downward and toward the portion of the locking face 20. When the start lever 18 is advanced upward, the projection 45 is moved away from the portion formed with the locking face 20 by being pushed by the upper corner of the locking face 20. When the locking face 20 is further advanced to pass over the projection 45, the projection 45 enters beneath the lower side of the locking face 20. By virtue of this movement, the start lever 18, once advanced, is held at its advanced position.

Figure 3:
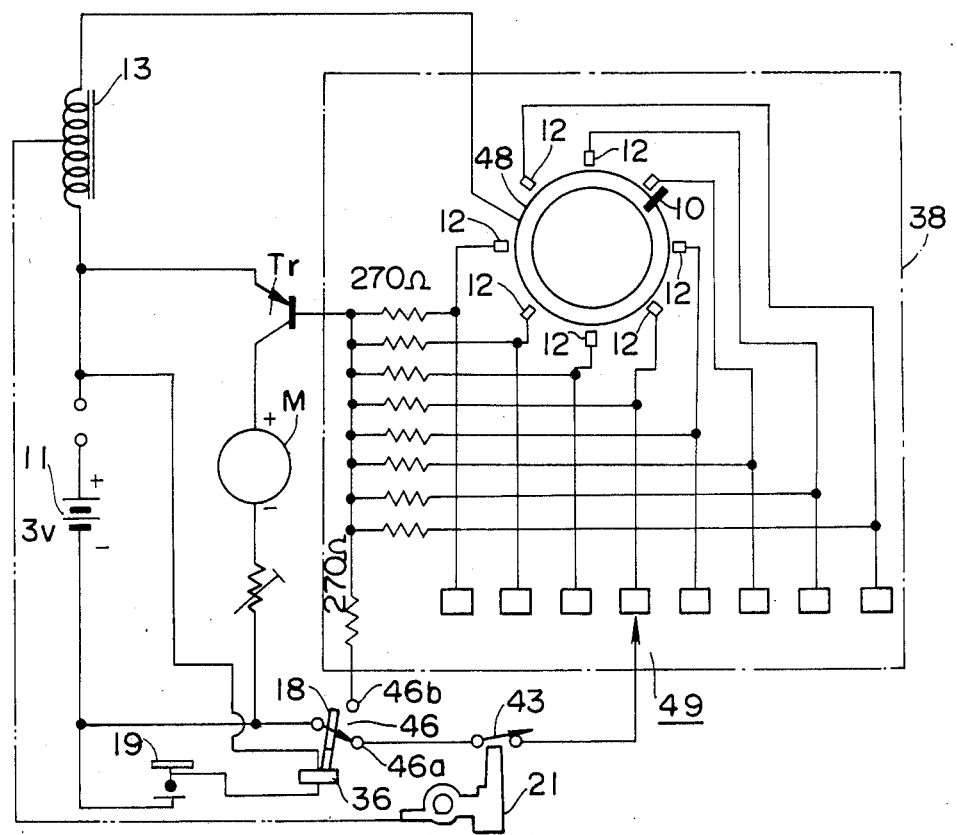
FIG. 3 is a circuit diagram of the invention.

A second switch 46, shown in detail in FIG. 3, acts to establish a by-pass circuit. The circuit of the motor M which had been cut off by advanced selection lever 21 can be completed by the by-pass circuit established at the advanced position of the start lever 18 caused by the action of the actuator 36 due to the user's operation of the start key 19. That is to say that the second switch 46 contacts one of the fixed contacts 46a when the start lever 18 takes its retracted position, and comes into contact with the fixed contact 46b when the start lever 18 takes its advanced position.

A stylus pressure lever 24 is supported at its one end in the chassis 31a. The stylus pressure lever 24 is urged by a spring 47 toward the turn table 7. The stylus pressure lever 24 has an opening at its midpoint to encompass the acoustic cylinder 9, which hangs on the flange 9b arranged on the lower axial end, and can be oscillatably moved in an axial direction of the center pin 8. The other end of the stylus pressure lever 24 engages the lower face of the stylus pressure control piece 18a disposed on the start lever 18. When the start lever 18 is in a retracted down-side position, the stylus pressure lever 24 contacts the acoustic cylinder 9 to take its lower position. This allows the sound transmitting member 6 and the tone arm 5 to retract upon the retraction of the reproduction stylus 3, resulting in the release of the stylus force. On the other hand, when the start lever 18 takes its advanced position advancing movement of the acoustic cylinder 9 is permitted by the stylus pressure spring 14, accompanying the advance of the reproducing stylus 3, thereby imparting the necessary stylus force.

The electric circuit incorporated in the device of the present invention will now be explained. As shown in FIG. 3, a plurality of fixed contacts 12 are positioned along the rotary path of the slidable rotary contact 10. A ring-shaped contact 48 is, also, disposed inside the area defined by the fixed contacts 12, but is separated from the fixed contacts 12 by an insulating area so that the slidable rotary contact 10 can slidably bridge between the ring-shaped contact 48 and any one of the fixed contacts 12.

The solenoid 13 and the power source 11 are connected in series to the ring-shaped contact 48. The fixed contacts 12 correlate with a selector switch 49 which can be connected to the power source 11 by the operator's selective depression of any one of the selection keys A through H of the toy 30.

Each fixed contact 12 and the selector switch 49 is connected in series to a corresponding 270 Ω resistor, the base and the emitter of a transistor Tr and to the power source 11. The collector of the transistor Tr is connected in series to the motor M, variable resistor VR and to the power source 11.

Each respective resistor and the transistor is connected to the second switch 46 through a second resistor having a resistance value of 270 Ω. The second switch 46 acts as a selection switch and is connected to both the power source 11 and the selector switch 49. The first switch 43 is placed between the second switch 46 and the selector switch 49.

The selector lever 21 is correlated to actuate the first switch 43 as shown in the drawings. Similarly, the second switch 46 is correlated with the start lever 18 operated by the electric actuator 36.

Supposing at first that, the start lever 18 is in the retracted position and the selection lever 21 is held in its retracted position by the flapper 13a of the solenoid 13 the first switch 43 is closed to connect the selector switch 49 to the power source 11 as well as the stylus force control piece 18a in FIG. 4 depresses the stylus pressure lever 24 into its retracted position holding the acoustic cylinder 9 in its retracted position.

In this state, the sound transmitting member 6, tone arm 5, and the reproduction stylus 3 are set at their retracted positions. The reproduction stylus 3 being thus retracted, is kept at a position away from the recorded face of the record disc 2. This releases the stylus force and allows the tone arm 5 to return to the starting point of sound reproduction 4.

Depression of any one of the reproduction selection keys A through H causes electric current to flow through the selector switch 49 and transistor Tr to the motor M, activating the motor, thereby causing the turn table 7 to rotate. Rotation of the turn table 7 also results in rotation of the slidable rotary contact 10 which contacts each of the fixed contacts 12 one after another. When the slidable rotary contact 10 engages the fixed contact 12 which has been selected by the selector switch 49, the solenoid 13 is energized and the flapper 13a releases the selection lever 21 allowing it to advance. Due to the advancement of selection lever 21, the foward tip end, initially, pushes the first switch 43 to the "OFF" position cutting the hpower to the motor M. Immediately thereafter, it engages the coupling recesses 15 and stops the rotation of the turn table 7. In this way, the reproduction stylus 3 is positioned where it can engage the selected starting point of the second reproduction 4 of the record groove 1 of the record disc 2.

Subsequent depression of the starting key 19 of the toy 30 will cause electric current to flow to the electric actuator 36 urging the start lever 18 to advance. When the start lever 18 is in the retracted position, the second switch 46 is connected to the selector switch 49 and to the power source 11 via fixed contact 46a. However, when the start lever 18 has advanced, the fixed contact 46b of the second switch 46 establishes an exclusive circuit for the motor M which is energized resulting in rotation of the turn table 7.

Advancement of the start lever 18 allows the selection lever 21 to swingably retract because of the advancement of the upwardly facing inclined face 18b against the resilient force given by the torsion spring 42. The start lever 18 maintains its advanced position by being supported by the projection 45 of the reset lever 23 entered beneath the locking face 20.

While the first switch 43 moves to the "ON" position the motor M is rotated only by the exclusive circuit for the motor M because the operator's hand has left the keys A–H such that the circuit is not established through the first switch 43 and the selector switch 49 to the motor M. Thus, the start lever 18 is kept in its advanced position so as to keep the second switch ON with its fixed contact 46b. Meanwhile, if the stylus pressure lever 24 is raised upward before the connection of the first switch 43 the reproduction stylus 3 can engage the recorded groove 1 of the record face of the record disc 2 at the starting point of sound reproduction 4 of the selected record groove of the record disc 2.

As the turn table 7 rotates, the reproduction stylus 3 can reproduce the recorded sounds by dropping into and following the selected groove 1 until it arrives at the end point of sound reproduction. Upon arrival of the reproduction stylus 3 at the end point of reproduction, the rear end of the tone arm 5 will release its depression over the rib 16a of the stop lever 16 allowing the forward end of the stop lever 16 to move away from the upper face of the turn table 7 by the force given by the spring 16b. The stop lever 16 will then strike the foward part of the reset lever 23 causing the reset lever 23 to rotate. This allows the projection 45 supporting the locking face 20 to escape from its location under the locking face 20 thereby permitting retraction of the start lever 18 to its initial position. When the start lever 18 is retracted, the stylus force control piece 18a fo the start lever 18 causes the stylus pressure lever 24 to retract, with accompanying retraction of the acoustic cylinder 9. The reproduction stylus 3 will also retract away from the record face of the record disc 2, permitting the reproducing stylus 3 to be released. Due to the retractive motion of the start lever 18, the second switch 46 cuts off the power supply to the exclusive circuit of the motor M and stops rotation of turn table 7.

When the stylus force exerted on the reproducing stylus 3 is released, the reproducing stylus 3 reverts back to the starting point of sound reproduction 4. The rear end of the base portion of the tone arm 5 depresses the stop lever 16 to move close to the upper face of the turn table 7. Thus, the forward end of the stop lever 16 moves downward to approach the upper face of the turn table 7.

In the operation as described above, the undulations of the record groove 1, transmitted to the reproducing stylus 3, are further transmitted to the acoustic cylinder 9 via the sound transmitting member 6 and sound transmitting tip 6b, and then to the speaker cone 32.

Having, thus, described the invention, what is claimed is:

1. A simplified sound reproducing device capable of reproducing a plurality of recorded items, comprising:
   a housing;
   a rotatable turn table having upper and lower surfaces thereon;
   a record disc held stationary by the housing, the record disc having a record face with a record grooves each having a starting point of sound reproduction;
   a tone arm having a pickup, the rotatable turn table swingably supporting the tone arm;
   a sound reproducing stylus mounted on the pickup;
   the pickup being engageable with the record disc and being able to swingably rotate along the record disc and toward the record face of the record disc, the tone arm being pivotally mounted on the turn table and being normally biased so that the reproducing stylus of the pickup is urged toward a starting point of sound reproduction;
   a sound transmitting member carried on the trn table, the sound transmitting member engaging the tone arm;
   a center pin extending perpendicularly upward from the housing which rotatably supports the turn table;
   a washer disposed around the center pin adjacent the upper surface of the turn table which prevents slippage of the turntable along the center pin;
   an acoustic cylinder capable of axial movement located around and supported by a stylus pressure spring, the acoustic cylinder having upper and lower end faces so that the upper face is capable of contacting the second transmitting member;
   a motor for powering the rotation of the turn table;
   a slidable rotary contact which rotates together with the turn table to select one of the plurality of record grooves;
   a plurality of fixed contacts corresponding to the starting points of sound reproduction located on the rotary path of the slidable rotary contact in accordance with a pre-determined locational relationship to that of starting points of sound reproduction of respective record grooves;
   an electric power source connected to each fixed contact;
   a solenoid energized by an electric current from the power source for fixing the locational relationship of engagement between the reproducing stylus and the specific record groove corresponding to that which has been selected, when the rotating slidable contact arrives at and contacts the fixed contact selected by an operator; and
   wherein the stylus pressure spring imparts a stylus pressure to the reproducing stylus, the stylus pressure spring disposed under the lower end portion of the acoustical cylinder so as to support the acoustic cylinder without supporting the turn table.

2. The simplified sound reproducing device of claim 1 further comprising:
   a sound transmitting tip located on the tone arm;
   the stylus pressure spring being disposed on the rear face of the acoustic cylinder so that the resilient force of the stylus pressure spring acts first on the acoustic cylinder apart from the turn table, and is then transmitted to the sound transmitting member contacting the front face of the acoustic cylinder via the sound transmitting tip.

3. The simplified sound reproducing device of claim 1, wherein the stylus pressure spring is a coil spring disposed around the center pin.

4. A simplified sound reproducing device capable of reproducing a plurality of recorded items, comprising:
   a housing;
   a rotatable turn table;
   a record disc held on the turn table, the record disc having a record face with a record grooves each having a starting point of sound reproduction;
   a tone arm having a pickup, the rotatable turn table swingably supporting the tone arm;
   a sound reproducing stylus mounted on the pickup;
   the pickup being engageable with the record disc and being able to swingably rotate along the record disc and toward the record face of the record disc, the tone arm being pivotally mounted on the turn table and being normally biased so that the reproducing stylus of the pickup is urged toward a starting point of sound reproduction;
   a sound transmitting member carried on the turn table, the sound transmitting member engaging the tone arm;
   a center pin extending perpendicularly upward from the housing which rotatably supports the turn table;
   an acoustic cylinder capable of axial movement located around and supported by the center pin, the acoustic cylinder having upper and lower end faces so that the upper face is capable of contacting the sound transmitting member;
   a motor for powering the rotation of the turn table;

a slidable rotary contact which rotates together with the turn table to select one of the plurality of record grooves;

a plurality of fixed contacts corresponding to the starting points of sound reproduction located on the rotary path of the slidable rotary contact in accordance with a pre-determined locational relationship to that of starting points of sound reproduction of respective record grooves;

an electric power source connected to each fixed contact;

a solenoid energized by an electric current from the power source for fixing the locational relationship of engagement between the reproducing stylus and the specific record groove corresponding to that which has been selected, when the rotating slidable contact arrives at and contacts the fixed contact selected by an operator;

a stylus pressure spring imparting a stylus pressure to the reproducing stylus, the stylus pressure spring being disposed under the lower end portion of the acoustical cylinder so as to avoid supporting the turn table; and the stylus pressure spring being disposed on the rear face of the acoustic cylinder so that the resilient force of the stylus pressure spring acts first on the acoustic cylinder apart from the turn table, and is then transmitted to the sound transmitting member contacting the front face of the acoustic cylinder via the sound transmitting tip;

wherein the stylus pressure spring is a coil spring disposed around a center pin;

a sound transmitting tip located on the tone arm;

a stop lever disposed on the turn table, the stop lever including:
 (a) one tip end urged toward the record disc;
 (b) a rib engaging part of said tone arm so as to restrain the stop lever against urging toward the disc, the rib capable of permitting the tip of the stop lever to rise upon the arrival of the tone arm at the end point of sound reproduction;

a guide portion formed on the turn table for guiding the rib;

a start lever normally urged toward the direction of retraction;

a start key capable of advancing said start lever against said urging;

a locking face formed on said start lever facing toward the direction of retraction;

a selection lever correlated with the start lever having the forward tip end movable between a normally urged position to engage one of the coupling recesses of the turn table and a retractable position when the start lever is advanced;

the solenoid situated in the "OFF" position when said select lever is in its retracted position;

a solenoid flapper located on the solenoid holding the select lever in its retracted position;

a reset pin disposed parallel to the center pin;

a reset lever having first and second ends journally received by the reset pin, being urged to swingably rotate in a direction opposite to said turn table;

the first end of the reset lever extending to a portion where it interferes with the tip end of the stop lever before finishing the sound reproduction and interferes with the tip end of the stop lever on or after finishing sound reproduction;

the second end of the reset lever positioned to permit turning and placement under the locking face of the start lever in its advanced position such that it can hold the start lever in its advanced position; and a stylus pressure lever extending in a transversely cross-wise direction to engage the acoustic cylinder, the stylus pressure lever capable of swingable reciprocal motion in the direction of axis of the acoustic cylinder being urged in a direction permitting advanced movement of the acoustic cylinder, thereby the stylus pressure lever capable of pushing down against urging of a stylus pressure spring permitting the acoustic cylinder to retract in its axial direction to thereby hold the acoustic cylinder at its retracted position.

5. A simplified sound reproducing device capable of reproducing a plurality of recorded items, comprising:

a housing;

a rotatable turn table;

a record disc having a record face, the record face having a plurality of record grooves each having a starting point of sound reproduction;

a tone arm having a pickup;

a sound reproducing stylus mounted on the pickup engageable with the record disc swingably received to rotate along the record toward a groove on the record face of the record disc the pickup being pivotally mounted and normally biased so that its reproducing stylus of the pickup can travel toward the starting point of sound reproduction;

a sound transmitting member carried on the turn table, the sound transmitting member engaging the tone arm;

a center pin extending perpendicularly upward from the housing rotatably supporting said turn table;

an acoustic cylinder supported by the center pin contacting the sound transmitting member and capable of axial movement;

a motor for rotating the turn table rotation;

a slidable rotary contact which rotates together with the turn table so as to select and reproduce any one of the plurality of record grooves;

a plurality of fixed contacts corresponding in number to the starting point of sound reproduction, located on the rotary path of the slidable rotary contact in accordance with a predetermined locational relationship to that of starting points of respective record grooves;

a power source connected to each fixed contact;

a solenoid disposed to be energized by electric current for fixing locational relationship of engagement between said reproducing stylus and said specific record groove corresponding to that has been selected, when said rotating slidable contact arrives at and contacts the stationary contact which has already been selected, a plurality of coupling recesses corresponding in number to that of a record disc located on said turn table around its side periphery;

a stop lever disposed on the turn table, the stop lever including;
 (a) one tip end urged toward the record disc;
 (b) a rib engaging a part of said tone arm so as to restrain the stop lever against urging toward the disc, the rib capable of permitting the tip of the stop lever to rise upon the arrival of the tone arm at the end point of sound reproduction;

a start lever normally urged toward the direction of retraction;

a start key capable of advancing said start lever against said urging;

a locking face formed on said start lever facing toward the direction of retraction;

a selection lever correlated with the start lever having the forward tip end movable between a normally urged position to engage one of the coupling recesses of the turn table and a retractable position when the start lever is advanced;

the solenoid situated in the "OFF" position when said select lever is in its retracted position;

a solenoid flapper located on the solenoid holding the select lever in its retracted position;

a reset pin;

a reset lever having first and second ends journally received by the reset pin, the reset lever disposed parallel to the center pin and being urged to swingably rotate in a direction opposite to said turn table;

the first end of the reset lever extending to a portion where it does not interfere with the tip end of the stop lever before finishing the sound reproduction and does not interfere with the end of the stop lever on or after finishing sound reproduction;

the second end of the reset lever positioned to permit turning and placement under the locking face of the start lever in its advanced position such that it can hold the start lever at its advanced position; and a stylus pressure lever extending in a transversely cross-wise direction to engage the acoustic cylinder, the stylus pressure lever capable of swingable reciprocal motion in the direction along axis of the acoustic cylinder being urged in a direction permitting advanced movement of the acoustic cylinder, thereby the stylus pressure lever is capable of pushing down against urging of a stylus pressure spring permitting the acoustic cylinder to retract in its axial direction to thereby hold the acoustic cylinder at its retracted position.

* * * * *